July 2, 1957  M. E. HATCHER  2,797,716
BENCH LATHES
Filed Sept. 21, 1955  2 Sheets-Sheet 2
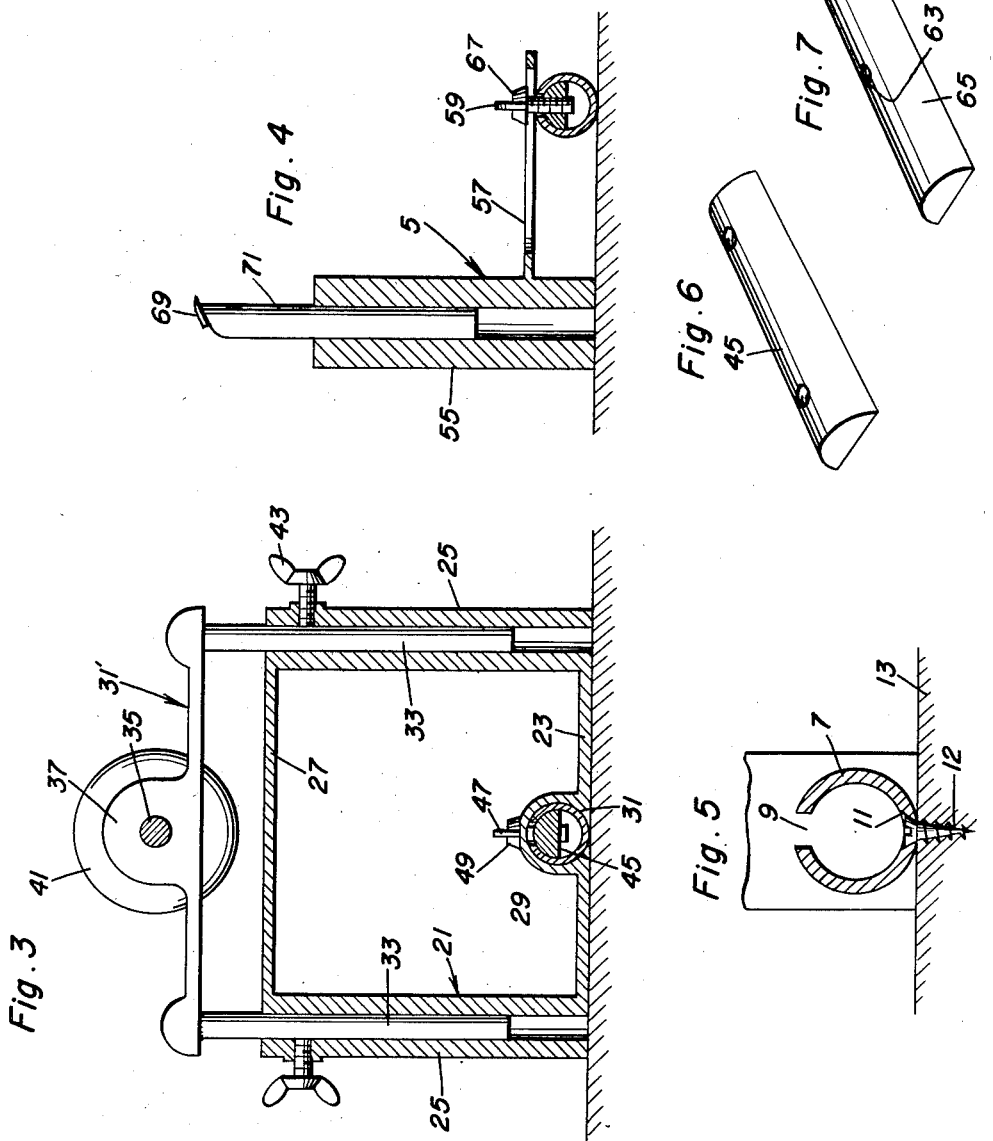
Merrel E. Hatcher
INVENTOR.

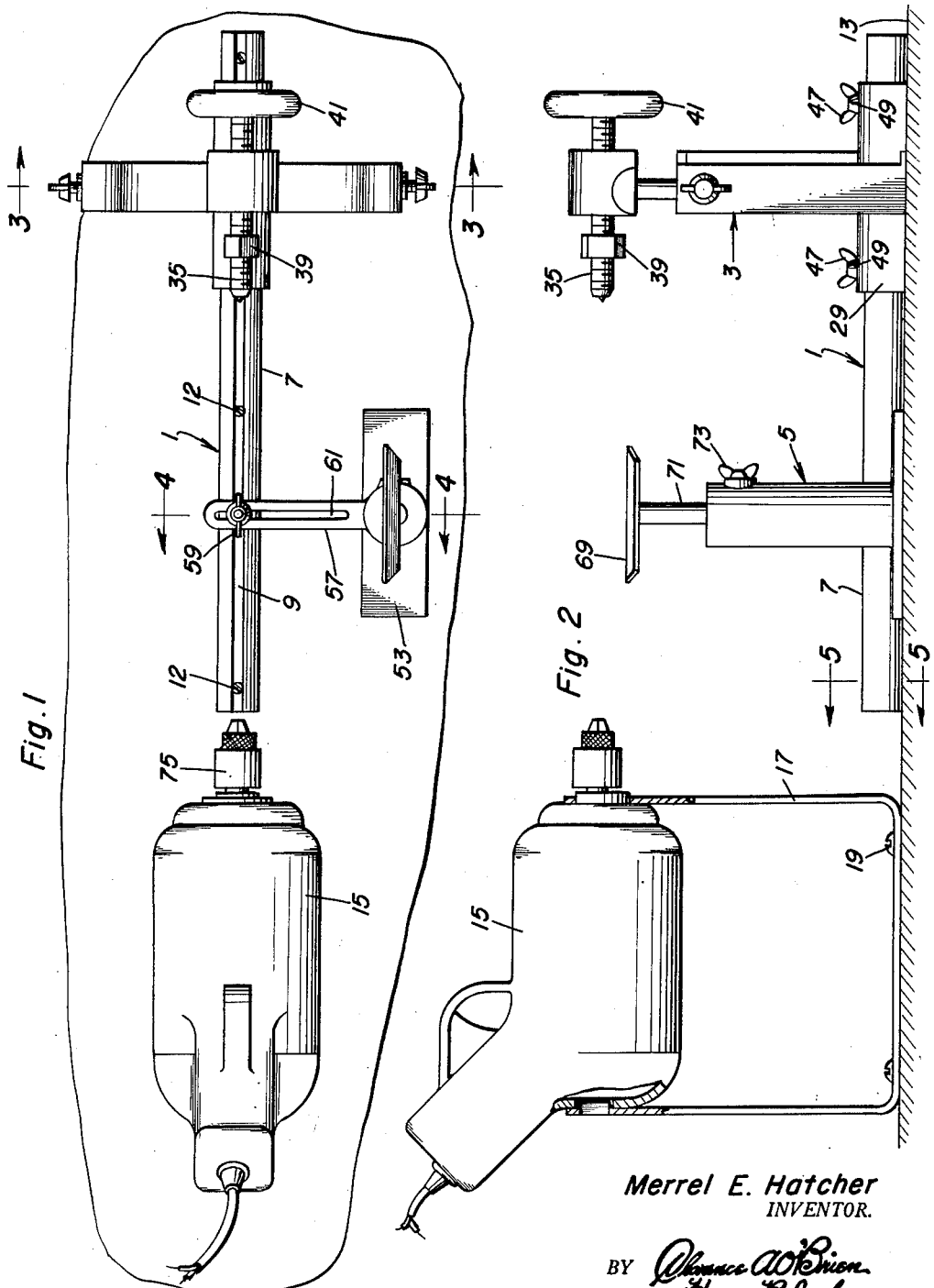

United States Patent Office 2,797,716
Patented July 2, 1957

2,797,716
BENCH LATHES

Merrel E. Hatcher, Richland, Wash.

Application September 21, 1955, Serial No. 535,647

2 Claims. (Cl. 142—1)

My invention relates to improvements in bench lathes for wood turning and the like.

The primary object of my invention is to provide means for mounting a tail stock and tool rest on a bench, or the like, so that a portable electric drill supported by a stand on the bench may be utilized for power in turning the work.

Another object is to provide means for mounting a tail stock carriage and a work support carriage on a base guide common to both carriages and for adjustment along said guide according to operating requirements easily and quickly.

Still another object is to provide for utilizing a length of stock tubing as the base guide so as to simplify the lathe.

Yet another object is to provide means for vertically adjusting the tail stock and the tool rest on their respective carriages in accordance with the height at which the electric drill is supported on a bench.

Other and subordinate objects together with the precise nature of my improvements will presently appear when the following description and claims are read with reference to the drawings accompanying and forming part of this specification, and in which:

Figure 1 is a fragmentary view in plan of my improved lathe mounted on a bench;

Figure 2 is a fragmentary view partly in side elevation and partly in section;

Figure 3 is an enlarged view in vertical transverse section taken on the line 3—3 of Figure 1;

Figure 4 is an enlarged view in vertical transverse section taken on the line 4—4 of Figure 1;

Figure 5 is an enlarged fragmentary view in vertical transverse section taken on the line 5—5 of Figure 2; and Figures 6 and 7 are enlarged views in perspective of a pair of clamping bars forming part of the means for mounting the tail stock carriage and the tool rest carriage respectively.

Referring to the drawings by numerals, according to my invention, a base guide 1 for a tail stock carriage 3 and a tool rest carriage 5 is provided comprising a guide tube 7 having a longitudinal top slot 9 therein extending from end to end thereof and having longitudinally spaced bottom screw holes, as at 11, therein by means of which and screws 12 said tube is secured on top of a bench 13 or the like in the vertical plane of and spaced forwardly of a portable pistol grip type electric drill 15 mounted with its axis horizontal in elevated position in a conventional U-bracket 17 secured on the bench 13 as by screws 19.

The tail stock carriage 3 comprises an open rectangular frame 21 transverse to the guide tube 7 and including a flat bottom bar 23 adapted to slidably seat on the bench 13, tubular side guides 25 rising from said bar 23, a flat top bar 27 cross-connecting said guides 25 and a central upstanding runner sleeve 29 on the bottom bar 23 transverse thereto with a circular opening 31 therein in which the guide tube 7 is slidably fitted so that the tail stock carriage 25 is slidably adjustable longitudinally of said tube 7 while being guided by said sleeve and tube and stabilized against vertical tilting about said tube 29 by sliding of the bottom bar 23 along the bench 13.

A U-shaped center pin mount 31' with depending side legs 33 is vertically slidable in the side guides 25. The usual lathe center pin 35 is threaded horizontally through an upstanding central boss 37 on the mount 31' with a lock nut 39 therein on one side of the boss 37 and a terminal adjusting hand wheel 41 thereon on its tail end. As will be clear, the slidable legs 33 provide for vertical adjustment of the mount 31' to correspondingly adjust the center pin 35. Wing bolts 43 in the side guides 25 for turning against the legs 33 hold the mount 31' and center pin 35 in selected vertically adjusted position.

The tail stock carriage 3 is locked in selected adjusted positions on the guide tube 29 by means of a clamping bar 45 of semicircular cross-section, slidably fitting in the upper half-portion of the guide tube 7, and a pair of wing bolts 47 in the ends of said bar 7 extending upwardly through the slot 9 with heads 49 adapted to engage said tube 29 at opposite sides of said slot.

The tool rest carriage 5 comprises a foot plate 53 adapted to slidably seat on the bench 13 at one side of the guide tube 7, a tubular guide post 55 rising centrally from the foot plate 53, and a lateral longitudinally slotted arm 57 on the post 55 overlying the guide tube 7. A wing bolt 59 extends through the slot 61 in the lateral arm 57 and through the slot 9 into a center opening 63 in a clamping bar 65, like the bar 45, with the head 67 of said bolt 59 engageable with said guide tube 7, like the heads 49. By this means, the tool rest carriage 5 is pivotally adjustable about the wing bolt 59 laterally and slidably adjustable laterally along said guide tube 7.

A flat tool rest bar 69 is centered and secured horizontally on a round stem 71 vertically slidably and rotatably adjustable in the post 55 to vertically and rotatably adjust said bar 69. A wing bolt 73 in the guide post 55 locks the stem 71 and the tool rest bar 69 in adjusted position in the carriage 5.

In operating the described lathe, the center pin mount 31' is vertically adjusted to align the center pin 35 with the chuck of the electric drill 13. The tail stock carriage 3 is then adjusted longitudinally of the guide tube 7 so that a piece of work, not shown, may be clamped at one end in the chuck 75 and engaged at its other end by the center pin 35 which is screw fed by the hand wheel 41 into the work. The tool rest bar 69 is vertically and rotatably adjusted in the post 55 to support a wood cutting tool, not shown, at the proper height for engaging the work. By adjusting the tool rest carriage 5 along the guide bar 7 and about the wing bolt 59, the tool may be positioned along the work and at selected angles thereto for cutting into the work. By means of the slot 61 and wing bolt 59, the tool rest carriages may be adjusted transversely of the guide tube 7 and work as may be required in supporting a tool relative to the work.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a lathe, the combination with an electric drill having a front chuck, and mounted on a bench in elevated position with its axis horizontal, of a hollow horizontal elongated base guide secured on said bench in a vertical plane of and forwardly of said electric drill, a tail stock carriage rising from said guide and embodying a runner sleeve on said guide slidable along the same whereby said carriage is slidably adjustable longitudinally of said guide toward and from said chuck, clamping means carried by said sleeve internally of said guide and engageable with said guide to lock said carriage in adjusted position, a center pin, and a mount on said carriage for said pin vertically adjustable to align said pin with said chuck, said carriage having tubular upright side guides, said mount being U-shaped with depending legs slidable in said side guides for vertical adjustment of said mount.

2. In a lathe, the combination with an electric drill having a front chuck and mounted in elevated position on a bench with its axis horizontal, of a hollow elongated base guide secured on said bench in the vertical plane of said electric drill and forwardly of said chuck, a tail stock carriage rising from said guide and embodying a runner sleeve on said guide slidable along the same whereby said carriage is slidably adjustable longitudinally of said guide toward and from said chuck, and clamping means carried by said sleeve internally of said guide and engageable with said guide to lock said carriage in adjusted position, said carriage comprising a rectangular open frame traversing said guide and slidably engaging said bench with said sleeve in the vertical center and bottom thereof, a U-shaped mount vertically slidably adjustable on said frame, and a center pin threadedly adjustable in said mount.

References Cited in the file of this patent

UNITED STATES PATENTS

| | | |
|---|---|---|
| 1,005,504 | Blugok | Oct. 10, 1911 |
| 2,005,101 | Merrigan | June 18, 1935 |
| 2,200,799 | Miller | May 14, 1940 |
| 2,733,741 | Lindee | Feb. 7, 1956 |